(12) United States Patent
Li et al.

(10) Patent No.: US 11,192,824 B1
(45) Date of Patent: *Dec. 7, 2021

(54) ARTIFICIAL SANDSTONE AND/OR CONGLOMERATE CORE BASED ON LITHOLOGY AND PORE STRUCTURE CONTROL AND PREPARATION METHOD AND APPLICATION THEREOF

(71) Applicant: China University of Petroleum (Beijing), Beijing (CN)

(72) Inventors: Yiqiang Li, Beijing (CN); Wenbin Gao, Beijing (CN); Zheyu Liu, Beijing (CN); Deng Pan, Beijing (CN); Xin Chen, Beijing (CN)

(73) Assignee: CHINA UNIVERSITY OF PETROLEUM (BEIJING), Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/008,057

(22) Filed: Aug. 31, 2020

(30) Foreign Application Priority Data

Jul. 9, 2020 (CN) .......................... 202010657401.X (51) Int. Cl.
C04B 14/06 (2006.01)
C09K 8/467 (2006.01)
C04B 28/02 (2006.01)

(52) U.S. Cl.
CPC .............. C04B 14/06 (2013.01); C04B 28/02 (2013.01); C09K 8/467 (2013.01)

(58) Field of Classification Search
CPC .......... C04B 14/06; C04B 28/02; C09K 8/467
See application file for complete search history.

(56) References Cited

FOREIGN PATENT DOCUMENTS

| CN | 103880384 A | 6/2014 | |
|---|---|---|---|
| CN | 103910514 A | 7/2014 | |
| CN | 108956224 | * 12/2018 | ............... G01N 1/26 |

OTHER PUBLICATIONS

Renqi, T. et al. "The Manufacture and study of HNT Artificial Rock Sample" {1998} Oil Drilliing & Production Technology 20(1): 98-102.

* cited by examiner

*Primary Examiner* — John E Uselding
(74) *Attorney, Agent, or Firm* — Volpe Koenig (57) ABSTRACT

The present disclosure relates to the technical field of artificial cores, in particular to a preparation method of artificial sandstone and/or conglomerate core based on lithology and pore structure control. The method comprises the following steps: mixing and molding sand particles and a inorganic cementing agent in sequence, and further adding a curing agent for performing solidification to prepare an artificial sandstone and/or conglomerate core; wherein composition of the sand particles is determined according to lithology and pore structure of the artificial sandstone and/or conglomerate core. The present disclosure combines the lithology and the pore structure of the artificial sandstone and/or conglomerate core with the composition of the sand particles, particularly regulates and controls the composition of the sand particles according to the pore throat distribution pattern and the average pore throat radius, thereby performing precise control on the artificial sandstone and/or conglomerate core.

14 Claims, 5 Drawing Sheets

ARTIFICIAL SANDSTONE AND/OR CONGLOMERATE CORE BASED ON LITHOLOGY AND PORE STRUCTURE CONTROL AND PREPARATION METHOD AND APPLICATION THEREOF

CROSS REFERENCE TO RELATED APPLICATIONS

This application claims priority to Chinese Application No. 202010657401.X, filed on 2020 Jul. 9 entitled "an artificial sandstone and/or conglomerate core based on lithology and pore structure control and a preparation method and an application thereof", which is specifically and entirely incorporated by reference.

FIELD

The present disclosure relates to the technical field of artificial cores, in particular to an artificial sandstone and/or conglomerate core based on lithology and pore structure control and a preparation method and an application thereof.

BACKGROUND

At present, the mainstream techniques for manufacturing artificial cores comprise two methods, namely cementing process (typical examples include epoxy resins and silicates) and sintering process (represented by phosphates).

In the aspect of pore structure control, the phosphoric acid sintered cores have excellent advantages, TANG Ren-qi published the manufacturing process of an aluminum phosphate sintered model on the Chinese Journal of *Oil Drilling & Production Technology* on 1985 and 1998 respectively, and disclosed that the pore throat distribution characteristic of the sintered core was improved by a way of compounding phosphate and clay minerals, such that the capillary pressure curve and the oil-water phase permeability curve of the sintered rock samples were similar with those of the natural cores. This was the first time to approximate the pore structure of the artificial core to the natural cores. However, after the phosphoric acid sintered cores were sintered at a high temperature, the initial wettability was strong hydrophilic, the manufacturing period with the sintering process was long, and the success rate was low.

The Chinese patent documents CN103880384A and CN103910514A respectively propose a method for preparing an epoxy resin artificial sandy conglomerate core to have pores with double-peak distribution, and indicate a method of adding a silicate particle in an epoxy resin binder, which causes that the pore throat distribution range of the artificial core is wider, and the double-peak distribution curve is adjustable. Although the method is applied in a certain scale, there are disadvantages regarding the complex subsequent treatment process and long treatment period, in addition, the problem that the obvious differences between the wettability and the interfacial property of the epoxy resin surface and those of the natural cores have not been effectively solved.

SUMMARY

The present disclosure aims to solve the problems in the prior art that the artificial cores have a commonplace and simple pore structure and centralized pore throat distribution, and the control of the pore structure has a low success rate, the treatment period is long, there are significant differences between the artificial cores and the natural cores, and provides the artificial sandstone and/or conglomerate core based on lithology and pore structure control, and a preparation method and an application thereof. The method combines the lithology and the pore structure, and performs precise control on the artificial sandstone and/or conglomerate core by adjusting the composition of the sand particles.

In order to achieve the above target, a first aspect of the present disclosure provides a method for preparing an artificial sandstone and/or conglomerate core, comprising the following steps: mixing and molding sand particles and an inorganic cementing agent in sequence, and further adding a curing agent for performing solidification to prepare the artificial sandstone and/or conglomerate core;

wherein composition of the sand particles is determined according to lithology and pore structure of the artificial sandstone and/or conglomerate core.

Preferably, the composition of the sand particles is regulated and controlled by Formula (I), $$f(\Phi) = \frac{C}{\sqrt{2\pi}\,\sigma_1} \cdot \exp\left(-\frac{(\Phi-\mu_1)^2}{2\sigma_1^2}\right) + \frac{1-C}{\sqrt{2\pi}\,\sigma_2} \cdot \exp\left(-\frac{(\Phi-\mu_2)^2}{2\sigma_2^2}\right) \quad (I)$$

wherein $\Phi$ is deposition granularity; $C$ is relative weight, $0 \le C \le 1$; $\mu_1$ is a first main peak mean, $\sigma_1$ is a first main peak variance; $\mu_2$ is a second main peak mean, and $\sigma_2$ is a second main peak variance.

In a second aspect, the present disclosure provides an artificial sandstone and/or conglomerate core produced with the method provided in the first aspect.

In a third aspect, the present disclosure provides an application of the artificial sandstone and/or conglomerate core provided in the second aspect in laboratory experiment of a sandstone and/or conglomerate reservoir formation.

Due to the aforementioned technical solution, the present disclosure combines the lithology and the pore structure of the artificial sandstone and/or conglomerate core with the composition of the sand particles, particularly regulates and controls the composition of the sand particles according to the pore throat distribution pattern and the average pore throat radius, thereby performing precise control on the artificial sandstone and/or conglomerate core.

Moreover, the present disclosure provides an inorganic cementing agent mainly consisting of Portland cement, wherein the inorganic cementing agent is filled in pores and fractures in the form of small particles, such that the pore structure of the artificial sandstone and/or conglomerate core is closer to that of the natural core; the artificial sandstone and/or conglomerate core provided by the present disclosure is used for experimental simulation of the sandy conglomerate with a complex pore structure, thereby ensuring the maximum similarity between an indoor displacement experiment and the current situation of oil field development.

BRIEF DESCRIPTION OF THE DRAWINGS

FIG. 1 illustrates a deposition granularity curve of the Example 1.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides a method for preparing an artificial sandstone and/or conglomerate core, comprising the following steps: mixing and molding sand particles and an inorganic cementing agent in sequence, and further adding a curing agent for performing solidification to prepare the artificial sandstone and/or conglomerate core;

wherein composition of the sand particles is determined according to lithology and pore structure of the artificial sandstone and/or conglomerate core.

Unless otherwise and specifically indicated, the lithology and pore structure of the artificial sandstone and/or conglomerate core in the present disclosure is determined by the lithology and pore structure of the natural core. Therefore, the artificial sandstone and/or conglomerate core with similar lithology and pore structure can be manufactured in the present disclosure according to the lithology and the pore structure of the natural core, so as to ensure the similarity between an indoor displacement experiment and the current situation of oil field development to the greatest extent.

According to the present disclosure, the composition of the sand particles is preferably regulated and controlled by Formula (I), $$f(\Phi) = \frac{C}{\sqrt{2\pi}\,\sigma_1} \cdot \exp\left(-\frac{(\Phi - \mu_1)^2}{2\sigma_1^2}\right) + \frac{1-C}{\sqrt{2\pi}\,\sigma_2} \cdot \exp\left(-\frac{(\Phi - \mu_2)^2}{2\sigma_2^2}\right) \quad (I)$$

wherein $\Phi$ is deposition granularity; C is relative weight, $0 \leq C \leq 1$; $\mu_1$ is a first main peak mean, $\sigma_1$ is a first main peak variance; $\mu_2$ is a second main peak mean, and $\mu_2$ is a second main peak variance. That is, the composition of the sand particles is dependent on the deposition granularity curve of the artificial sandstone and/or conglomerate core.

According to the present disclosure, the deposition granularity value $\Phi$ in the deposition granularity curve is a result of bimodal granularity superposition, wherein the bimodal granularity superposition means that two granularity peaks in normal distribution are mutually superposed, namely the design of granularity form diversification of the artificial core is ensured by adjusting the pattern variance of the width, thickness and height of the front and rear granularity peaks; $\mu_1$ is the mean or average of the first granularity peak, i.e., the first main peak mean, typically representing the position of the large particle peak or coarse particle peak; $\sigma_1$ is the variance of the first granularity peak, namely the first main peak variance, the larger is the numerical value, the greater is the peak width; similarly, $\mu_2$ is the mean or average of the second granularity peak, i.e., the second main peak mean, typically representing the position of the small particle peak or fine particle peak; $\sigma_2$ is the variance of the second granularity peak, i.e., the second main peak variance.

In the present disclosure, the deposition granularity curve is a result of superposition of two normal distribution peaks, and the diversified design of the granularity curve is implemented by adjusting the morphological characteristics such as relative height, width, distance of the distribution peaks. The purpose of controlling the pore structure of the artificial sandy conglomerate is fulfilled through moving the granularity curve.

Further preferably, the composition of the sand particles is regulated and controlled by the following steps:

1) taking physical property parameters of a natural core as target parameters for regulating and controlling the artificial sandstone and/or conglomerate core, wherein the target parameters comprise the relative weight, the first main peak variance, the second main peak variance;

2) obtaining a lithology classification chart based on the relative weight, the first main peak variance and the second main peak variance, and then obtaining the first main peak mean of the artificial sandstone and/or conglomerate core according to the lithology classification chart;

3) obtaining the second main peak mean of the artificial sandstone and/or conglomerate core according to the pore structure of the artificial sandstone and/or conglomerate core;

4) obtaining a deposition granularity curve of the artificial sandstone and/or conglomerate core according to the relative weight, the first main peak mean, the first main peak variance, the second main peak mean and the second main peak variance; and 5) determining particle size and weight content of the sand particles according to the deposition granularity curve of the artificial sandstone and/or conglomerate core.

In a preferred embodiment of the present disclosure, the physical property parameters of the natural core in the step 1) are obtained by inverse fitting according to the Formula (I). Specifically, a deposition granularity curve of the natural core is tested by adopting the industry standard SY/T5434-2018, and then a parameter range of granularity in the natural core is determined by utilizing the Formula (I), namely the ranges of the relative weight, the first main peak variance and the second main peak variance in the granularity curve of the natural core are counted, and morphological characteristics such as height, width, distance of two normal distribution peaks are respectively identified.

The deposition granularity curve of the natural core is decomposed into two normal distribution peaks, and the deposition granularity curve of the artificial sandstone and/or conglomerate core with similar lithology and pore structure is obtained mainly by adjusting the relative distance of the two normal distribution peaks, namely the first main peak mean $\mu_1$ and the second main peak mean $\mu_2$.

In the present disclosure, the lithology of the artificial sandstone and/or conglomerate core depends on the lithology classification chart, and preferably, the lithology classification chart in the step 2) is obtained by the following steps:

A. Respectively drawing corresponding deposition granularity curves by adjusting relative distance of the first main peak and the second main peak based on the relative weight, the first main peak variance and the second main peak variance in the step 1);

B. Respectively counting the weight of particles with different deposition granularities based on the deposition granularity curve, and classifying the lithology of the corresponding core;

C. Drawing the lithology classification charts with different deposition granularities by taking the first main peak mean as an abscissa and the second main peak mean as an ordinate.

Preferably, adjusting the relative distance of the first main peak and the second main peak refers to that the first main peak mean and the second main peak mean are adjusted under the condition that the relative weight, the first main peak variance and the second main peak variance of the artificial sandstone and/or conglomerate core are determined, and corresponding deposition granularity curves are respectively drawn according to the sizes of the first main peak mean and the second main peak mean.

In the present disclosure, the lithology classification purpose of the artificial sandstone and/or conglomerate core is realized by utilizing the deposition granularity curve, the particle weights of 6 grades of medium gravel, fine gravel, coarse sand, medium sand, fine sand and silt sand in the corresponding deposition granularity curve in the step A are respectively counted, the corresponding deposition granularity range is shown in Table 1, and the corresponding deposition granularity curve is classified by referring to the clastic rock naming principle in the industry standard SY/T5434-2018, namely the clastic rock granularity analysis method. The deposition granularity curve is designed by means of a double-peak granularity superposition method, so as to fulfill the purpose of controlling the lithology and permeability of the artificial sandstone and/or conglomerate core.

In a preferred embodiment of the present disclosure, the lithology is conglomerate when the gravel content is greater than 50 wt %, based on the weight of the sand particles. In particular, when the weight ratio of fine gravel to gravel is greater than 50%, the lithology is fine conglomerate; when the weight ratio of the medium gravel to the gravel is more than 50%, the lithology is medium conglomerate; when the weight ratio of the fine gravel to the medium gravel is 0.4-0.6, the lithology is anisometric conglomerate.

In a preferred embodiment of the present disclosure, the lithology is sandy conglomerate when the gravel content is within a range of 25-50 wt %, based on the weight of the sand particles.

In a preferred embodiment of the present disclosure, the lithology is conglomerate-bearing sandstone when the gravel content is within a range of 5-25 wt % and the sand content is >75 wt %, based on the weight of the sand particles. Specifically, when the weight ratio of coarse sand/medium sand/fine sand to sand content is more than 50%, the lithology is gravel-containing coarse sandstone/gravel-containing medium sandstone/gravel-containing fine sandstone; when the content of coarse sand, medium sand and fine sand/silt sand is respectively and independently more than 20 wt %, and the content of any two of the coarse sand, the medium sand, the fine sand and the silt sand is less than 70 wt % based on the weight of sand content, the lithology is gravel-containing anisometric sandstone.

In a preferred embodiment of the present disclosure, the lithology is sandstone when the gravel content is less than 5 wt % and the sand content is greater than 75 wt %, based on the weight of the sand particles. Specifically, when the weight ratio of coarse sand/medium sand/fine sand to sandstone is more than 50%, the lithology is coarse sandstone/medium sandstone/fine sandstone; when the content of coarse sand, medium sand and fine sand/silt sand is respectively and independently more than 20 wt %, and the content of any two of the coarse sand, the medium sand, the fine sand and the silt sand is less than 70 wt % based on the weight of sand content, the lithology is anisometric sandstone.

In the present disclosure, a preferred embodiment of the lithology classification chart includes: A. under the conditions that the relative weight C=0.4, the first main peak variance $\sigma_1$=0.85 and the second main peak variance

TABLE 1

| Particle grade | Gravel | | Sand | | | |
| --- | --- | --- | --- | --- | --- | --- |
| | Medium gravel | Fine gravel | Coarse sand | Medium sand | Fine sand | Silt sand |
| Particle size, mm | 4-64 | 2-4 | 0.5-2 | 0.25-0.5 | 0.1-0.25 | 0.01-0.1 |
| Particle size, mesh | <5 | 5-9 | 9-32 | 32-62 | 62-150 | 150-1200 |
| Granularity Φ | −6 to −2 | −2 to −1 | −1 to 1 | 1-2 | 2-3.32 | >3.32 |

After determining the weight contents of the sand particles with different grades, classifying the lithology, wherein the lithology is conglomerate when the content of the gravel is more than 50 wt % based on the weight of the sand particles; when the content of the gravel is within a range of 25-50 wt %, the lithology is sandy conglomerate; when the gravel content is within a range of 5-25 wt % and the sand content is more than 75 wt %, the lithology is the conglomerate-bearing sandstone; when the gravel content is less than 5 wt % and the sand content is more than 75 wt %, the lithology is sandstone.

$\sigma_2$=2.2, respectively calculating the deposition granularity curves of different values of the first main peak mean and the second main peak mean; B. defining the names of the artificial core under a deposition granularity curve according to the lithology naming rule; C. drawing lithology classification charts of the first main peak mean and the second main peak mean under different deposition granularities, and determining a design parameter range of the target lithology based on the drawn lithology classification charts.

According to the lithology classification chart, the lithology of the artificial sandstone and/or conglomerate core is determined by the first main peak mean, and the position of the second main peak is adjusted, namely the second main peak mean is changed from small to large, which means that the smaller is the particle size of the added fine particle sandstone, the larger is the weight proportion of the fine particle sandstone, the smaller is a size of the pores formed by mutual stacking, thus the pore structure of the artificial core becomes smaller and smaller.

In the present disclosure, the second main peak mean of the artificial sandstone and/or conglomerate core is determined by the pore structure, preferably, the pore structure in step 3) comprises a pore throat distribution pattern and an average pore throat radius; further preferably, the pore throat distribution pattern depends on peak-to-width ratio, wherein the peak-to-width ratio is regulated and controlled by Formula (II):

$$F = -16.256 \cdot \frac{\sigma}{\bar{\mu}} + 269.82 \cdot \frac{\sigma}{C_m \bar{\mu}} + 2.3323$$

(II), wherein F is the peak-to-width ratio; $\bar{\sigma}$ is a mean variance of particles, and $$\sigma = \frac{\sigma_1 \sigma_2}{C\sigma_2 + (1-c)\sigma_1};$$

$\bar{\mu}$ is a mean average of particles, and $\bar{\mu}=C\mu_1+(1-C)\mu_2$; $C_m$ is content of the inorganic cementing agent with a unit of wt %.

Figure 3:
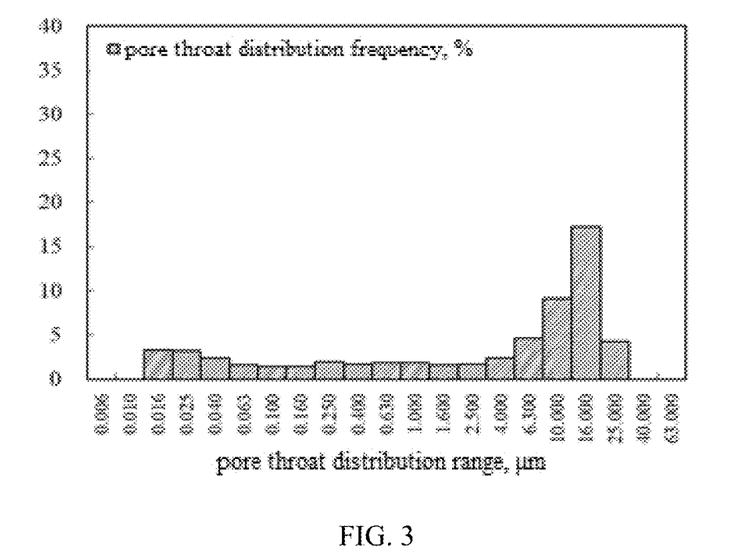
FIG. 3 illustrates a graph of the sharp peak and thin tail type pore throat distribution curve of the artificial sandstone core of the Example 1.
Figure 5:
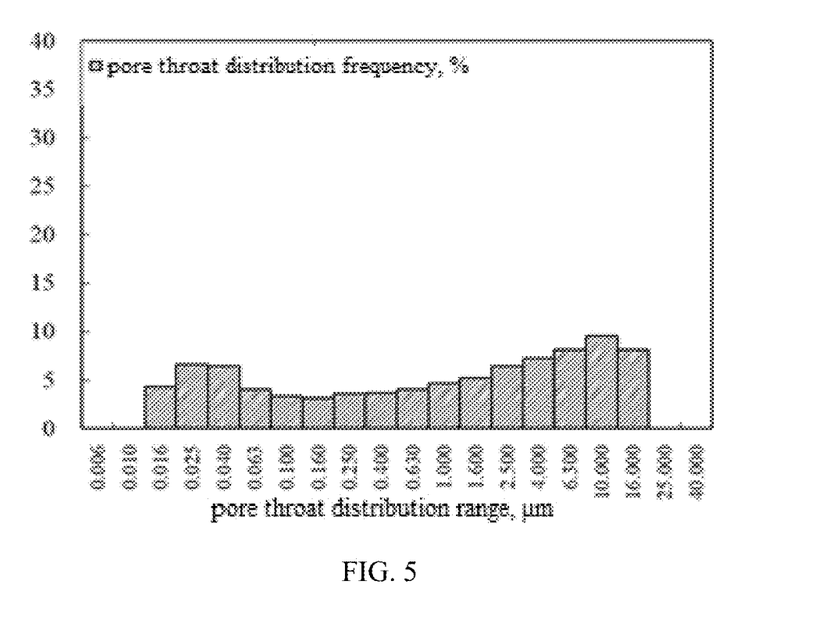
FIG. 5 shows a graph of the slow peak and thin tail type pore throat distribution curve of the artificial conglomerate core of the Example 2.
Figure 6:
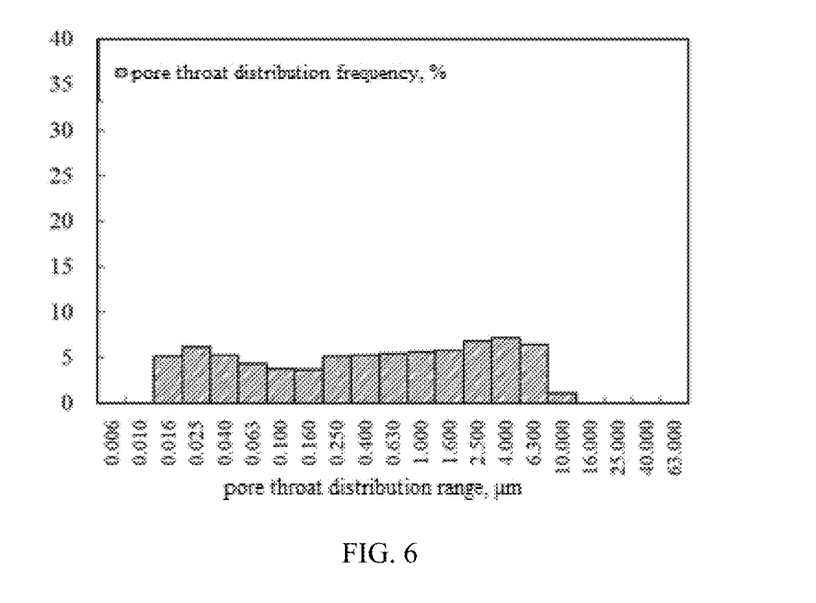
FIG. 6 illustrates a slow peak and horizontal tail type pore throat distribution curve of the artificial sandy conglomerate core of the Example 3.

In a preferred embodiment of the present disclosure, when the peak-to-width ratio is within a range of 3.5≤F≤20, the pore throat distribution pattern is sharp peak and thin tail type, as shown in FIG. 3; and/or, when the peak-to-width ratio is within a range of 2<F<3.5, the pore throat distribution pattern is a slow peak and thin tail type, as illustrated in FIG. 5; and/or, when the peak-to-width ratio within a range of 0.1≤F≤2, the pore throat distribution pattern is a slow peak and horizontal tail type, as shown in FIG. 6.

Preferably, when molding pressure is within a range of 2-6 MPa, the average pore throat radius satisfies Formula (III): $R_p=2.179 \cdot \bar{\mu} \cdot C_m \cdot 39.932 \cdot \bar{\mu} - 31.514 \cdot \bar{\sigma} - 6.493 \cdot C_m + 158.928$ (III), wherein Rp is the average throat radius; $\bar{\sigma}$ is a mean variance of particles, and $$\sigma = \frac{\sigma_1 \sigma_2}{C\sigma_2 + (1-c)\sigma_1};$$

$\bar{\mu}$ is a the mean average of particles, and $\bar{\mu}=C\mu_1+(1-C)\mu_2$; $C_m$ is content of the inorganic cementing agent with a unit of wt %.

Preferably, when molding pressure is within the range of 7-16 MPa, the average pore throat radius satisfies Formula (IV):

$$R_p = -1.389 \cdot \frac{\bar{\mu}}{\mu_v - \frac{\sigma}{\bar{\mu}} + \bar{\mu}(1+\mu_v)} + 3.101, \quad (IV)$$

wherein Rp is the average pore throat radius; $\bar{\sigma}$ is a mean variance of particles, and $$\sigma = \frac{\sigma_1 \sigma_2}{C\sigma_2 + (1-c)\sigma_1};$$

$\bar{\mu}$ is a mean average of particles, and $\bar{\mu}=C\mu_1+(1-C)\mu_2$; $\mu_v$ is a variable coefficient of the bimodal granularity of the particles, and $$\mu_v = \frac{\sqrt{C(\mu_1-\bar{\mu})^2 + (1-C)(\mu_2-\bar{\mu})^2}}{\bar{\mu}};$$

$C_m$ is content of the inorganic cementing agent with a unit of wt %.

In the present disclosure, the relative weight, the first main peak variance and the second main peak variance of the artificial sandstone and/or conglomerate core are determined according to the physical property parameters of natural lithology; the first main peak mean of the artificial sandstone and/or conglomerate core is obtained according to the lithology of the artificial sandstone and/or conglomerate core in combination with the lithology classification chart; the second main peak mean of the artificial sandstone and/or conglomerate core is determined based on the pore structure of the artificial sandstone and/or conglomerate core, in particular the pore throat distribution pattern and the average pore throat radius. Therefore, the deposition granularity curve of the artificial sandstone and/or conglomerate core is obtained according to the relative weight, the first main peak variance, the first main peak mean, the second main peak variance and the second main peak mean; the particle size and the weight content of the sand particles are further derived according to the deposition granularity curve.

Preferably, the sand particles is gravel with Φ≤−1 and/or sand with Φ>−1; further preferably, the gravel with Φ≤−1 is medium gravel with −6≤Φ≤−2 and/or fine gravel with −2<Φ≤−1; the sand with Φ>−1 is at least one selected from the group consisting of coarse sand with −1<Φ≤1, medium sand with 1<Φ≤2, fine sand with 2<Φ≤3.32 and silt sand with 3.32<Φ≤6.64.

According to the present disclosure, it is preferable that in the deposition granularity curve of the artificial sandstone and/or conglomerate core in the step 5), the abscissa—deposition granularity satisfies Formula (V): Φ=−log$_2$ D, which determining the particle size of the sand particles; the ordinate—probability percentage is the weight content of the sand particles.

In a preferred embodiment of the present disclosure, in the deposition granularity curve of the artificial sandstone and/or conglomerate core, the particle size range and the weight content ratio of the sand particles are determined according to the Formula (V), and the suitable ore material is further determined based on the particle size range, wherein the ore material is at least one selected from the group consisting of river sand, quartz sand and potash feldspar.

In the present disclosure, the inorganic cementing agent is filled in the pores and fractures in the form of small particles, which are similar to the "Argillaceous/matrix cementation" of the natural conglomerate core, such that the pore structure is closer to the actual conglomerate core. Preferably, the weight ratio of the sand particles, the inorganic cementing agent and the curing agent is 100: 13-20:3-8.

Preferably, the inorganic cementing agent comprises: 60-70 parts by weight of Portland cement, 25-35 parts by weight of inorganic salt aqueous solution and 0-5 parts by weight of reinforcing agent.

In the present disclosure, the Portland cement may be selected from a wide range, the Portland cement is cement conventionally used in the technical field. Preferably, the Portland cement is at least one selected from the group consisting of 600 mesh composite Portland cement, 800 mesh ultra-fine cement, 400 mesh Portland cement and 600 mesh Portland cement.

Preferably, concentration of inorganic salt in the inorganic salt aqueous solution is 0.1-1 wt %, preferably 0.3-0.6 wt %; wherein the inorganic salt is at least one selected from the group consisting of calcium chloride, magnesium chloride, sodium bicarbonate, sodium chloride and sodium carbonate.

Preferably, the reinforcing agent is clay and/or aluminum fluoride, wherein the clay is at least one selected from the group consisting of kaolin, montmorillonite, illite and chlorite. When the reinforcing agent is clay, on one hand, the influence of the clay in the stratum on the oil displacement efficiency and the seepage characteristic of the displacing agent can be fully simulated, and on the other hand, the cementing strength can be further improved by utilizing the clay content.

When the reinforcing agent is aluminum fluoride, aluminum atoms can be fully utilized for combining with hydroxyl in tricalcium silicate ($3CaO.SiO_2$) formed by cement solidification to compete and form Si—O—Al bonds, the number of the hydroxyl in a consolidation grid structure is increased, on one hand, the consolidation strength is increased; on the other hand, the set cement is prevented from expanding after being contacted with water for a long time, and the flow stability under the fluid saturated pore is ensured.

In the present disclosure, the curing agent may be selected from a wide range, preferably, the curing agent is an aqueous solution of inorganic salt, wherein the concentration of inorganic salt in the aqueous solution of the inorganic salt is 0.1-1 wt %, preferably 0.3-0.6 wt %; the inorganic salt is at least one selected from the group consisting of calcium chloride, magnesium chloride, sodium bicarbonate, sodium chloride and sodium carbonate.

In the present disclosure, molding conditions may be selected from a wide range, as long as the cementing agent is molded with the sand particles. Preferably, the molding is performed at a temperature of 10-40° C. and a pressure of 2-16 MPa for 10-30 min.

Preferably, the curing is performed at a temperature of 10-40° C. for 3-5 days.

Figure 7:
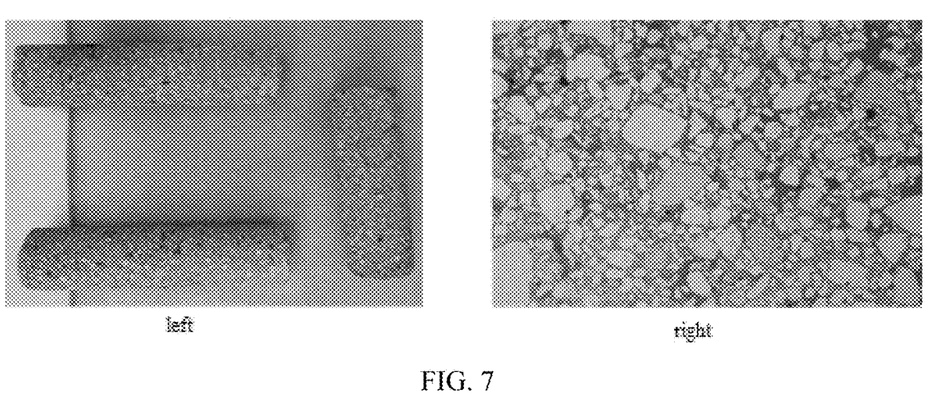
FIG. 7 shows an exterior appearance schematic view of an artificial sandstone and/or conglomerate core, the figure on the left shows a physical image of the artificial sandstone and/or conglomerate core; and the figure on the right shows a slice image of the artificial sandy conglomerate cast body.

In a preferred embodiment of the present disclosure, the sand particles and the inorganic cementing agent are uniformly mixed according to a weight ratio of 100:13-20, the mixture is transferred into a grinding tool for pressing and molding, the pressing process is continuously performed at a temperature of 10-40° C. and a pressure of 2-16 MPa for 10-30 min. After the compression molding process, a small amount of the curing agent is added, the model is placed at 10-40° C. for curing for 3-5 days, then the cores ($\varphi$38, $\varphi$25) with corresponding sizes can be drilled, and the cured product is cut to obtain the artificial core with the corresponding size, such as the column-shape core with the dimensions of Φ38×150 mm (i.e., a diameter Φ of 38 mm and a length of 150 mm), or the cuboid core with the dimensions of 45×45×300 mm, wherein the exterior appearance schematic view of the artificial sandstone and/or conglomerate core is shown in FIG. 7, wherein the figure on the left shows a physical image of the artificial sandstone and/or conglomerate core, and the figure on the right shows a slice image of the artificial sandy conglomerate cast body.

The inorganic cementing agent provided by the present disclosure enables the pore throat distribution range of the artificial sandstone and/or conglomerate core to reach the nanometer level, and the artificial sandstone and/or conglomerate core with the pores covering the pore throat distribution of "whole-pore-scale" consisting of the nanometer level, micron level and submillimeter level has been successfully developed, as shown in FIG. 3, FIG. 5 and FIG. 6.

In a second aspect, the present disclosure provides an artificial sandstone and/or conglomerate core produced with the method provided in the first aspect.

According to the present disclosure, lithology of the artificial sandstone and/or conglomerate core is preferably at least one selected from the group consisting of conglomerate, sandy conglomerate, conglomerate-bearing sandstone and sandstone.

Preferably, a pore throat distribution pattern of the artificial sandstone and/or conglomerate core is at least one selected from the group consisting of a sharp peak and thin tail type, slow peak and thin tail type, and a slow peak and horizontal tail type.

Preferably, an average pore throat radius of the artificial sandstone and/or conglomerate core is within a range of 0.5-18 μm; wherein the average pore throat radius is measured with a conventional mercury intrusion test method, the commonly used conventional mercury intrusion instrument is AutoPore IV 9500~AutoPore IV 9520, as for the specific standard, please refer to the national standard GB/T29171-2012 of the People's Republic of China (PRC) in regard to the determination of rock capillary pressure curve.

The present disclosure provides an application of the artificial sandstone and/or conglomerate core provided by the second aspect in laboratory experiment of a sandstone and/or conglomerate reservoir formation.

The present disclosure will be described in detail below with reference to the Examples.

The average pore throat radius of the artificial sandstone and/or conglomerate core is measured with a conventional mercury intrusion test method, the commonly used conventional mercury intrusion instrument is AutoPore IV 9500~AutoPore IV 9520, as for the specific standard, please refer to the national standard GB/T29171-2012 of the PRC in regard to the determination of rock capillary pressure curve.

Example 1

Figure 1A:
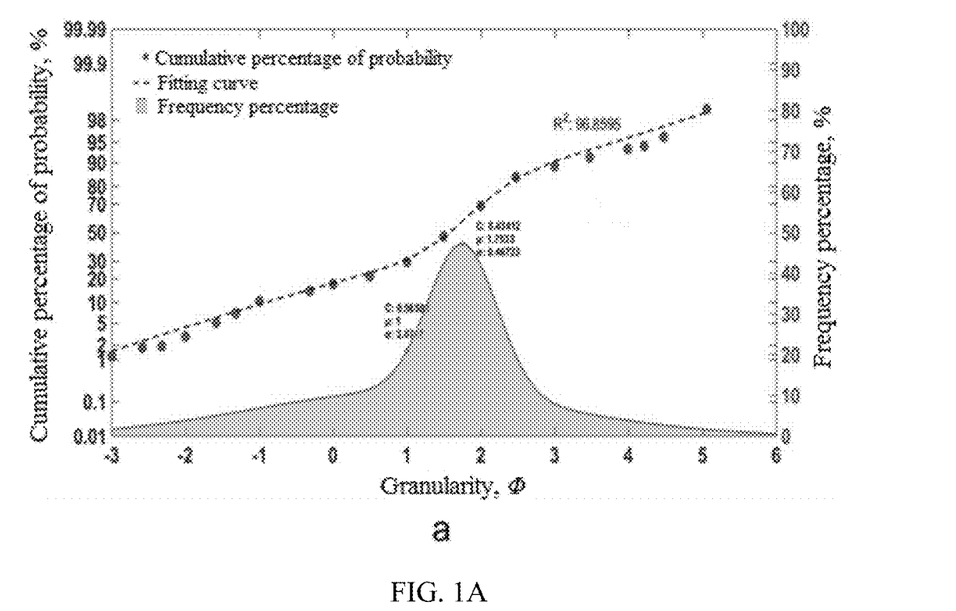
FIG. 1A shows a deposition granularity curve for a natural core.

Preparation of the sharp peak and thin tail type artificial sandstone core with an average pore throat radius of 10-12 μm (1) Composition and Particle Granularity Characteristic Statistics of Natural Core The natural core was derived from Daqing oil field of China, the deposition granularity curve of the natural core was tested by using an industry standard SY/T5434-2018, as shown in FIG. 1A, a first main peak variance $\sigma_1$ and a second main peak variance $\sigma_2$ as representatives of a research area were counted through inversion fitting of the Formula (I), the statistics showed that the relative weight C was between 0.45 and 0.9, the first main peak variance $\sigma_1$ was between 1.6 and 3.7, the second main peak variance $\sigma_2$ was between 0.4 and 1.7.

(2) Lithology Control of the Artificial Sandstone Core

Figure 2:
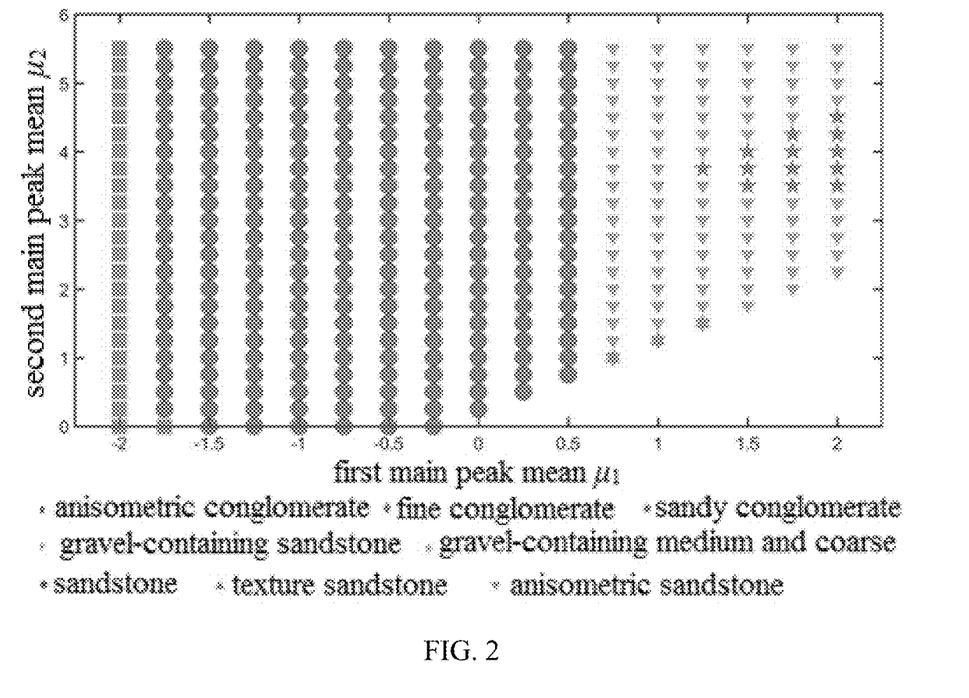
FIG. 2 illustrates a lithology classification chart of the Example 1.

According to the lithology classification chart, as shown in FIG. 2, in the case that the relative weight C was 0.728, the first main peak variance $\sigma_1$ was 2.45, and the second main peak variance $\sigma_2$ was 0.65, in order to guarantee that the lithology is the artificial sandstone core, it was required to ensure that the first main peak mean $\mu_1$ was within a range of 0.75-1.75, that is, the first main peak mean $\mu_1$ was 1.

(3) Design of Pore Throat Distribution Pattern of the Artificial Sandstone Core

The relative weight C was 0.728, the first main peak variance $\sigma_1$ was 2.45, the second main peak variance $\sigma_2$ was 0.65, the first main peak mean $\mu_1$ was 1, and the pore throat distribution pattern was controlled by calculating the peak-to-width ratio according to the Formula (II), in the meanwhile, the following Formula was satisfied:

$$F = \frac{-26.208}{\mu} + \frac{435.005}{\mu C_m} + 2.3323, \text{ and } 3.5 \le F \le 20,$$

if the content of the inorganic cementing agent was selected to be 14.5 wt %, $\bar{\mu}=0.728 \cdot \mu_1 + 0.272 \cdot \mu_2$ and $1 \le \bar{\mu} \le 3.25$, then $1 \le \mu_2 \le 9.271$;

if the content of the inorganic cementing agent was selected to be 15 wt %, $\bar{\mu}=0.728 \cdot \mu_1 + 0.272 \cdot \mu_2$ and $1 \le \bar{\mu} \le 2.393$, then $1 \le \mu_2 \le 7.673$;

(4) Control of Average Pore Throat Radius of the Artificial Sandstone Core

If it was selected that the content of the inorganic cementing agent was 14.5 wt %, the relative weight C was 0.728, the first main peak variance $\sigma_1$ was 2.45, the second main peak variance $\sigma_2$ was 0.65, the first main peak mean $\mu_1$ was 1, and the second main peak mean $\mu_2$ was within a range $1 \le \mu_2 \le 9.271$, the sharp peak and thin tail type pore throat distribution was satisfied.

When the molding pressure was within a range of 2-6 MPa, the average pore throat radius satisfied the Formula (III), i.e.:

$R_p = 2.179 \cdot \bar{\mu} \cdot C_m - 39.932 \cdot \bar{\mu} - 31.514 \cdot \bar{\mu} - 6.493 \cdot C_m + 158.928$, and $10 \le R_p \le 12$, The range $1.178 \le \mu_2 \le 2.061$ was obtained, i.e., the second main peak mean $\mu_2$ was 1.5.

(5) Preparation of Sharp Peak and Thin Tail Type Artificial Sandstone Core with an Average Pore Throat Radius of 10-12 μm.

The manufacturing parameters of the artificial sandstone core were obtained as follows: C=0.728, $\mu_1=1$, $\mu_2=1.5$, $\sigma_1=2.45$, $\sigma_2=0.65$, such that the deposition granularity curve of the artificial sandstone core was obtained as shown in FIG. 1B, wherein the content of an inorganic cementing agent was 14.5 wt %.

Figure 1B:
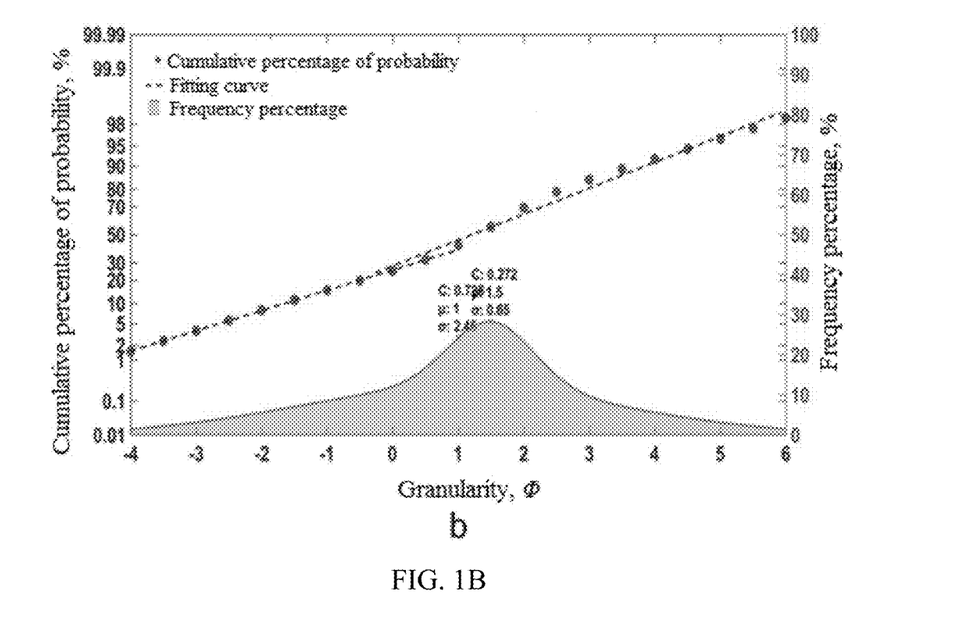
FIG. 1B shows a deposition granularity curve for an artificial sandstone and/or conglomerate core.

According to FIG. 1B, in combination with the Formula (V), the compound ratio of the sand particles was obtained, that is, 196 g of 10-20 meshes of river sand, 487 g of 20-40 meshes of river sand, 365 g of 40-60 meshes of river sand, 295 g of 60-100 meshes of river sand, 191 g of 100-200 meshes of quartz sand and 170 g of 200-800 meshes of potassium feldspar were weighed and uniformly mixed to prepare 1703 g of total mineral raw materials.

247 g of 600-mesh superfine cement and 120 g of aqueous solution with the calcium chloride mass concentration of 0.4 wt % were mixed with the sand particles uniformly, the mixture was then put into a mould, the mixture was pressed for 10 minutes and preliminarily molded under the compaction stress of 5.11 MPa and the temperature of 25° C., 130 g of aqueous solution with the calcium chloride mass concentration of 0.4 wt % was added, the mixture was continuously solidified for 3 days, and the homogeneous artificial sandstone core with the dimensions Φ3.8×15 cm was prepared after drilling, its pore throat distribution was shown in FIG. 3.

Upon measurement, the average pore throat radius of the homogeneous artificial sandstone core was 10.68 μm, the pore throat distribution pattern was a sharp peak and thin tail type, and the peak-to-width ratio F was 3.97.

Example 2

Preparation of the slow peak and thin tail type artificial conglomerate core with an average pore throat radius of 4.5-6 μm (1) Composition and Particle Granularity Characteristic Statistics of Natural Core The natural core was derived from Xinjiang oil field of China, the deposition granularity curve of the natural core was tested by using an industry standard SY/T5434-2018, a first main peak variance $\sigma_1$ and a second main peak variance $\sigma_2$ as representatives of a research area were counted through inversion fitting of the Formula (I), the statistics showed that the relative weight C was between 0.25 and 0.6, the first main peak variance $\sigma_1$ was between 0.5 and 1.5, the second main peak variance $\sigma_2$ was between 1.5 and 2.6.

(2) Lithology Control of the Artificial Conglomerate Core

According to the lithology classification chart, in the case that the relative weight C was 0.4, the first main peak variance $\sigma_1$ was 0.85, and the second main peak variance $\sigma_2$ was 2.2, in order to guarantee that the lithology is the artificial conglomerate core, it was required to ensure that the first main peak mean $\mu_1$ was within a range $-2 < \mu_1 < 0$, that is, the first main peak mean $\mu_1$ was −0.75.

(3) Design of Pore Throat Distribution Pattern of the Artificial Conglomerate Core The relative weight C was 0.4, the first main peak variance $\sigma_1$ was 0.85, the second main peak variance $\sigma_2$ was 2.2, first main peak mean $\mu_1$ was −0.75, and the pore throat distribution pattern was controlled by calculating the peak-to-width ratio according to the Formula (II), in the meanwhile, the following Formula was satisfied:

$$F = \frac{-21.87}{\mu} + \frac{362.995}{\mu C_m} + 2.3323, \text{ and } 2 < F < 3.5,$$

if the content of the inorganic cementing agent was selected to be 16 wt %, $-0.407 < \bar{\mu} = 0.4 \cdot \mu_1 + 0.6 \cdot \mu_2 < 1.427$, then $-0.179 < \mu_2 < 2.879$;

if the content of the inorganic cementing agent was selected to be 17 wt %, $-2.258 < \bar{\mu} = 0.4 \cdot \mu_1 + 0.6 \cdot \mu_2 < 0.644$, then $-3.263 < \mu_2 < 1.574$;

(4) Control of Average Pore Throat Radius of the Artificial Conglomerate Core

If it was selected that the content of the inorganic cementing agent was 17 wt %, the relative weight C was 0.4, the first main peak variance $\sigma_1$ was 0.85, the second main peak variance $\sigma_2$ was 2.2, the first main peak mean $\mu_1$ was −0.75, and the second main peak mean $\mu_2$ was within a range $-3.263 < \mu_2 < 1.574$, the slow peak and thin tail type pore throat distribution was satisfied.

When the molding pressure was within a range of 2-6 MPa, the average pore throat radius satisfied the Formula (III), i.e.:

$R_p = 2.179 \cdot \bar{\mu} \cdot C_m - 39.9321 \cdot \bar{\mu} - 31.514 \cdot \bar{\mu} - 6.493 \cdot C_m + 158.928$, and $4.55 \le R_p \le 6$, The range $0.587 \leq \mu_2 \leq 1.45$ was obtained, i.e., the second main peak mean $\mu_2$ was 1.25.

(5) Preparation of Slow Peak and Thin Tail Type Artificial Conglomerate Core with an Average Pore Throat Radius of 4.5-6 μm.

The manufacturing parameters of the artificial conglomerate core were obtained as follows: C=0.4, $\mu_1$=−0.75, $\mu_2$=1.25, $\sigma_1$=0.85, $\sigma_2$=2.2, such that the deposition granularity curve of the artificial conglomerate core was obtained, wherein the content of an inorganic cementing agent was 17 wt %.

According to the deposition granularity curve of the artificial conglomerate core, in combination with the Formula (V), the compound ratio of the sand particles was obtained, that is, 137 g of river sand with 3-5 meshes, 477 g of river sand with 5-12 meshes, 308 g of river sand with 12-20 meshes, 265 g of river sand with 20-40 meshes, 117 g of river sand with 40-60 meshes, 128 g of river sand with 60-100 meshes, 127 g of quartz sand with 100-200 meshes and 105 g of potassium feldspar with 200-800 meshes were weighted, and mixed uniformly to prepare 1664 g of total mineral raw materials.

283 g of 600 mesh superfine cement and 142 g of aqueous solution with the calcium chloride mass concentration of 0.6 wt % were mixed with the sand particles uniformly, the mixture was then put into a mould, the mixture was pressed for 20 minutes and preliminarily molded under the compaction stress of 5.11 MPa and the temperature of 25° C., 130 g of aqueous solution with the calcium chloride mass concentration of 0.4 wt % was added, the mixture was continuously solidified for 5 days, and the homogeneous artificial conglomerate core with the dimensions Φ3.8×15 cm was prepared after drilling, its pore throat distribution was shown in FIG. 5.

Upon measurement, the average pore throat radius of the homogeneous artificial conglomerate core was 5.57 μm, the pore throat distribution pattern was a slow peak and thin tail type, and the peak-to-width ratio F was 2.17.

Example 3

Preparation of the slow peak and horizontal tail type artificial sandy conglomerate core with an average pore throat radius of 2-3.5 μm (1) Composition and Particle Granularity Characteristic Statistics of Natural Core The natural core was derived from Xinjiang oil field of China, the deposition granularity curve of the natural core was tested by using an industry standard SY/T5434-2018, a first main peak variance $\sigma_1$ and a second main peak variance $\sigma_2$ as representatives of a research area were counted through inversion fitting of the Formula (I), the statistics showed that the relative weight C was between 0.25 and 0.6, the first main peak variance $\sigma_1$ was between 0.5 and 1.5, the second main peak variance $\sigma_2$ was between 1.5 and 2.6.

(2) Lithology Control of the Artificial Sandy Conglomerate Core

Figure 4:
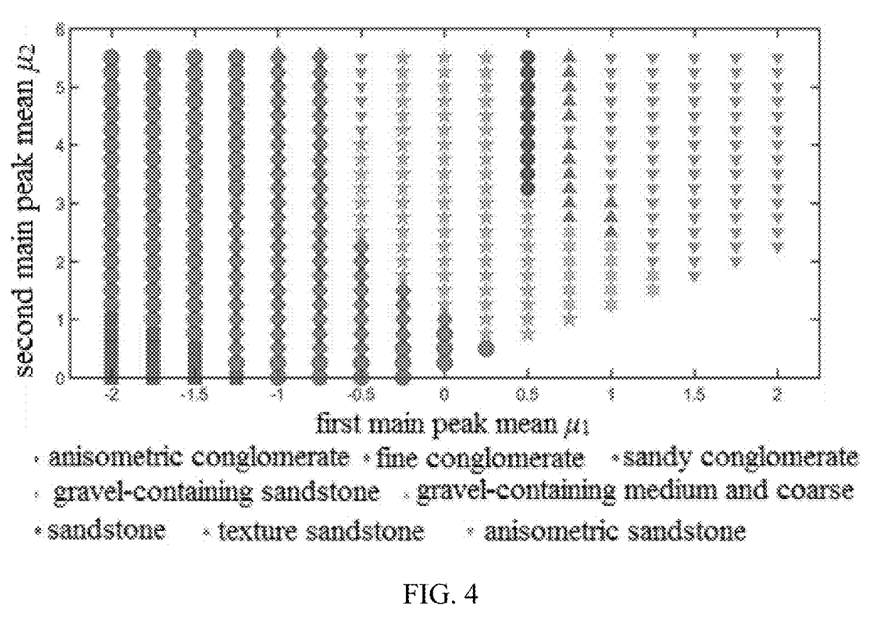
FIG. 4 illustrates a lithology classification chart of the Example 2.

According to the lithology classification chart, as shown in FIG. 4, in the case that the relative weight C was 0.4, the first main peak variance $\sigma_1$ was 0.85, and the second main peak variance $\sigma_2$ was 2.2, in order to guarantee that the lithology is the artificial sandy conglomerate core, it was required to ensure that the first main peak mean $\mu_1$ was within a range of $-1 < \mu_1 < 0$, that is, the first main peak mean $\mu_1$ was −0.15.

(3) Design of Pore Throat Distribution Pattern of the Artificial Sandy Conglomerate Core The relative weight C was 0.4, the first main peak variance $\sigma_1$ was 0.85, the second main peak variance $\sigma_2$ was 2.2, first main peak mean $\mu_1$ was −0.15, and the pore throat distribution pattern was controlled by calculating the peak-to-width ratio according to the Formula (II), in the meanwhile, the following Formula was satisfied:

$$F = \frac{-21.87}{\mu} + \frac{362.995}{\mu C_m} + 2.3323, \text{ and } 0.1 \leq F \leq 2,$$

if the content of the inorganic cementing agent was selected to be 17 wt %, $\bar{\mu}=0.4 \cdot \mu_1 + 0.6 \cdot \mu_2$ and $0.205 \leq \bar{\mu} \leq 1.373$, then $0.441 \leq \mu_2 \leq 2.39$;

if the content of the inorganic cementing agent was selected to be 17.5 wt %, $\bar{\mu}=0.4 \cdot \mu_1 + 0.6 \cdot \mu_2$ and $0.478 \leq \bar{\mu} \leq 3.205$, then $0.897 \leq \mu_2 \leq 5.44$;

(4) Control of Average Pore Throat Radius of the Artificial Sandy Conglomerate Core If it was selected that the content of the inorganic cementing agent was 17 wt %, the relative weight C was 0.4, the first main peak variance $\sigma_1$ was 0.85, the second main peak variance $\sigma_2$ was 2.2, the first main peak mean $\mu_1$ was −0.15, and the second main peak mean $\mu_2$ was within a range $0.441 \leq \mu_2 \leq 2.39$, the slow peak and horizontal tail type pore throat distribution was satisfied.

When the molding pressure was within a range of 7-16 MPa, the average pore throat radius satisfied the Formula (IV), i.e.:

$$R_p = -1.389 \cdot \frac{\mu}{\mu_v - \frac{\sigma}{\mu} + \mu(1+\mu_v)} + 3.101, \text{ and } 2 \leq R_p \leq 3.5,$$

The range $\mu_2 \geq 1.538$ was obtained, i.e., the second main peak mean $\mu_2$ was 2.

(5) Preparation of Slow Peak and Horizontal Tail Type Artificial Sandy Conglomerate Core with an Average Pore Throat Radius of 2-3.5 μm.

The manufacturing parameters of the artificial sandy conglomerate core were obtained as follows: C=0.4, $\mu_1$=−0.15, $\mu_2$=2, $\sigma_1$=0.85, $\sigma_2$=2.2, such that the deposition granularity curve of the artificial sandy conglomerate core was obtained, wherein the content of an inorganic cementing agent was 17 wt %, and the pressing pressure was 11 MPa.

According to the deposition granularity curve of the artificial sandy conglomerate core, in combination with the Formula (V), the compound ratio of the sand particles was obtained, that is, 54 g of river sand with 3-5 meshes, 303 g of river sand with 5-12 meshes, 343 g of river sand with 12-20 meshes, 366 g of river sand with 20-40 meshes, 141 g of river sand with 40-60 meshes, 152 g of river sand with 60-100 meshes, 170 g of quartz sand with 100-200 meshes and 174 g of potassium feldspar with 200-800 meshes were weighted, and mixed uniformly to prepare 1703 g of total mineral raw materials.

289 g of 600 mesh superfine cement and 132 g of aqueous solution with the calcium chloride mass concentration of 0.6 wt % were mixed with the sand particles uniformly, the mixture was then put into a mould, the mixture was pressed for 20 minutes and preliminarily molded under the compaction stress of 11 MPa and the temperature of 25° C., 130 g of aqueous solution with the calcium chloride mass concentration of 0.4 wt % was added, the mixture was continuously solidified for 5 days, and the homogeneous artificial sandstone and/or conglomerate core with the dimensions Φ3.8× 15 cm was prepared after drilling, its pore throat distribution was shown in FIG. 6.

Upon measurement, the average pore throat radius of the homogeneous artificial sandstone and/or conglomerate core was 2.346 μm, the pore throat distribution pattern was a slow peak and horizontal tail type, and the peak-to-width ratio F was 1.228.

According to the Examples 1 to 3, the lithology and the pore structure of the artificial sandstone and/or conglomerate core and the composition of the sand particles are combined in the present disclosure, and particularly, the composition of the sand particles is regulated and controlled according to the pore throat distribution pattern and the average pore throat radius, so as to perform the precise control of the artificial sandstone and/or conglomerate core.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A method for preparing an artificial sandstone and/or conglomerate core, comprising the following steps: mixing and molding sand particles and a inorganic cementing agent in sequence, and further adding a curing agent for performing solidification to prepare the artificial sandstone and/or conglomerate core;
   wherein composition of the sand particles is determined according to lithology and pore structure of the artificial sandstone and/or conglomerate core;
   wherein the composition of the sand particles is regulated and controlled by Formula (I), $$f(\Phi) = \frac{C}{\sqrt{2\pi}\,\sigma_1} \cdot \exp\left(-\frac{(\Phi-\mu_1)^2}{2\sigma_1^2}\right) + \frac{1-C}{\sqrt{2\pi}\,\sigma_2} \cdot \exp\left(-\frac{(\Phi-\mu_2)^2}{2\sigma_2^2}\right) \quad (I)$$

wherein f is deposition granularity curve; $\Phi$ is deposition granularity; C is relative weight, $0 \le C \le 1$; $\mu_1$ is a first main peak mean, $\sigma_1$ is a first main peak variance; $\mu_2$ is a second main peak mean, and $\sigma_2$ is a second main peak variance;
   wherein the composition of the sand particles is regulated and controlled by the following steps:
   1) taking physical property parameters of a natural core as target parameters for regulating and controlling the artificial sandstone and/or conglomerate core, wherein the target parameters comprise the relative weight, the first main peak variance, the second main peak variance;
   2) obtaining a lithology classification chart based on the relative weight, the first main peak variance and the second main peak variance, and then obtaining the first main peak mean of the artificial sandstone and/or conglomerate core according to the lithology classification chart;
   3) obtaining the second main peak mean of the artificial sandstone and/or conglomerate core according to the pore structure of the artificial sandstone and/or conglomerate core;
   4) obtaining a deposition granularity curve of the artificial sandstone and/or conglomerate core according to the relative weight, the first main peak mean, the first main peak variance, the second main peak mean and the second main peak variance; and
   5) determining particle size and weight content of the sand particles according to the deposition granularity curve of the artificial sandstone and/or conglomerate core;
   wherein the lithology of the artificial sandstone and/or conglomerate core is at least one selected from the group consisting of conglomerate, sandy conglomerate, conglomerate-bearing sandstone and sandstone; and the pore structure comprises a pore throat distribution pattern and an average pore throat radius.

2. The method of claim 1, wherein the physical property parameters of the natural core in the step 1) are obtained by inverse fitting according to the Formula (I).

3. The method of claim 1, wherein the lithology classification chart in the step 2) is obtained by the following steps:
   A. Respectively drawing corresponding deposition granularity curves by adjusting relative distance of the first main peak and the second main peak based on the relative weight, the first main peak variance and the second main peak variance in the step 1);
   B. Respectively counting weight of particles with different deposition granularities based on the deposition granularity curve, and classifying the lithology of the corresponding core;
   C. Drawing the lithology classification charts with different deposition granularities by taking the first main peak mean as an abscissa and the second main peak mean as an ordinate.

4. The method of claim 1, wherein the pore throat distribution pattern depends on peak-to-width ratio.

5. The method of claim 4, wherein the peak-to-width ratio is regulated and controlled by Formula (II):

$$F = -16.256 \cdot \frac{\sigma}{\mu} + 269.82 \cdot \frac{\sigma}{C_m \mu} + 2.3323 \quad (II)$$

wherein F is the peak-to-width ratio; $\overline{\sigma}$ is a mean variance of particles, and $$\sigma = \frac{\sigma_1 \sigma_2}{C\sigma_2 + (1-c)\sigma_1},$$

C is relative weight, $0 \le C \le 1$, σ1 is a first main peak variance, and σ2 is a second main peak variance; $\overline{\mu}$ is a mean average of particles, $\overline{\mu} = C\mu_1 + (1-C)\mu_2$, C is relative weight, $0 \le C \le 1$, μ1 is a first main peak mean, and μ2 is a second main peak mean; $C_m$ is content of the inorganic cementing agent with a unit of wt %.

6. The method of claim 5, wherein when the peak-to-width ratio is within a range of $3.5 \le F \le 20$, the pore throat distribution pattern is sharp peak and thin tail type; and/or
   when the peak-to-width ratio is within a range of $2 < F < 3.5$, the pore throat distribution pattern is a slow peak and thin tail type; and/or when the peak-to-width ratio is within a range of 0.1≤F≤2, the pore throat distribution pattern is a slow peak and horizontal tail type.

7. The method of claim 1, wherein when molding pressure is within a range of 2-6 MPa, the average pore throat radius satisfies Formula (III):

$$R_p = 2.179 \cdot \bar{\mu} \cdot C_m - 39.932 \cdot \bar{\mu} - 31.514 \cdot \bar{\mu} - 6.493 \cdot C_m + 158.928 \quad \text{(III)}$$

wherein Rp is the average throat radius; $\bar{\sigma}$ is a mean variance of particles, and $$\sigma = \frac{\sigma_1 \sigma_2}{C\sigma_2 + (1-c)\sigma_1},$$

C is relative weight, 0≤C≤1, $\sigma_1$ is a first main peak variance, and $\sigma_2$ is a second main peak variance; $\bar{\mu}$ is a mean average of particles, $\bar{\mu} = C\mu_1 + (1-C)\mu_2$, C is relative weight, 0≤C≤1, $\mu_1$ is a first main peak mean, and $\mu_2$ is a second main peak mean; $C_m$ is content of the inorganic cementing agent with a unit of wt %; and/or when molding pressure is within the range of 7-16 MPa, the average pore throat radius satisfies Formula (IV):

$$R_p = -1.389 \cdot \frac{\bar{\mu}}{\mu_v - \frac{\sigma}{\bar{\mu}} + \bar{\mu}(1+\mu_v)} + 3.101 \quad \text{(IV)}$$

wherein Rp is the average pore throat radius; $\bar{\sigma}$ is a mean variance of particles, and $$\sigma = \frac{\sigma_1 \sigma_2}{C\sigma_2 + (1-c)\sigma_1},$$

C is relative weight, 0≤C≤1, σ1 is a first main peak variance, and σ2 is a second main peak variance; $\bar{\mu}$ is a mean average of particles, $\bar{\mu} = C\mu_1 + (1-C)\mu_2$, C is relative weight, 0≤C≤1, $\mu_1$ is a first main peak mean, and $\mu_2$ is a second main peak mean; $\mu_v$ is a variable coefficient of the bimodal granularity of particles, $$\mu_v = \frac{\sqrt{C(\mu_1 - \bar{\mu})^2 + (1-C)(\mu_2 - \bar{\mu})^2}}{\bar{\mu}},$$

C is relative weight, 0≤C≤1, μ is a mean average of particles, $\mu_1$ is a first main peak mean, and $\mu_2$ is a second main peak mean; $C_m$ is content of the inorganic cementing agent with a unit of wt %.

8. The method of claim 1, wherein in the deposition granularity curve of the artificial sandstone and/or conglomerate core in the step 5), abscissa—deposition granularity satisfies Formula (V): $\Phi = -\log_2 D$, wherein $\Phi$ is deposition granularity and D is particle size of sand particles, and the particle size of the sand particles is determined by Formula (V); ordinate—probability percentage is the weight content of the sand particles.

9. The method of claim 8, wherein the sand particles is gravel with $\Phi \leq -1$ and/or sand with $\Phi > -1$.

10. The method of claim 4, wherein the gravel with $\Phi \leq -1$ is medium gravel with $-6 < \Phi \leq -2$ and/or fine gravel with $-2 < \Phi \leq -1$.

11. The method of claim 9, wherein the sand with $\Phi > -1$ is at least one selected from the group consisting of coarse sand with $-1 < \Phi \leq 1$, medium sand with $1 < \Phi \leq 2$, fine sand with $2 < \Phi \leq 3.32$ and silt sand with $3.32 < \Phi \leq 6.64$.

12. The method of claim 1, wherein weight ratio of the sand particles, the inorganic cementing agent and the curing agent is 100:13-20:3-8.

13. The method of claim 1, wherein a pore throat distribution pattern of the artificial sandstone and/or conglomerate core is at least one selected from the group consisting of a sharp peak and thin tail type, slow peak and thin tail type, and a slow peak and horizontal tail type.

14. The method of claim 1, wherein an average pore throat radius of the artificial sandstone and/or conglomerate core is within a range of 0.5-18 μm.

* * * * *